Patented Feb. 12, 1935

1,990,917

UNITED STATES PATENT OFFICE 1,990,917

METHOD OF PRODUCING FOOD PRODUCTS

William J. Plews, New York, N. Y., assignor of one-half to Lektophone Corporation, Jersey City, N. J., a corporation of Delaware No Drawing. Application June 10, 1930, Serial No. 460,297

3 Claims. (Cl. 99—10)

This invention relates to food products and their production. Specifically it has to do with so-called chick peas (Cicer arietinum).

One object of the invention is to provide a new food product consisting of chick peas that have been placed in a new edible condition, and a further object is to provide an improved process of treating chick peas to place them in that condition.

Chick peas in their most familiar form are in the dried raw condition. They are slightly larger in size than the common variety of green peas. They are quite hard and tough, whitish in color, and have a somewhat wrinkled appearance. They have a thin tough skin which must be removed before they are placed in an edible condition by any process whatsoever. They are much cheaper than beans and other varieties of peas commonly marketed in this country, and have a high food value. They contain about 6% fat as compared with 1.5% in beans and other kinds of peas. However, their sale has been largely restricted to persons of foreign extraction, mainly for the reason that they have never been marketed in a form which appeals to the other classes, and also because of the difficulty of removing the tough skins.

So far as I am aware, there are only two processes now known of placing raw chick peas in edible condition. One process is to mix the chick peas with sand and allow them to bake for a prolonged period. The peas are stirred in the sand and the tough outer skins are rubbed off. This process is employed by the natives where the chick peas are grown. It is a crude lengthy process and is not of a commercial character. It has been found by analyzing peas baked in this manner that none, or very little, of the starch has been dextrinized, rendered soluble or otherwise converted and, therefore, they are fattening and indigestible. Moreover, the color of the chick peas is not materially altered by this process and, therefore, they are no more tempting or attractive than the raw chick peas. The other process consists in soaking the peas for about twenty-four hours, and then boiling or otherwise cooking them for a prolonged period. In this process the skins are usually removed by mashing the peas through a colander or the like.

Chick peas are usually sold to the consumer in this country, in one of three conditions,—(1) in the dried raw condition, in which case they have to be soaked and cooked by the consumer; (2) in the condition in which they have been sand baked, in which case they are usually eaten in that condition; or (3) packaged in cans in a soaked and boiled condition so that they are ready to be eaten either with or without heating.

I have developed an improved process by which dried raw chick peas may be placed in an attractive, edible, and easily digested form in a fraction of a minute.

According to my process, the dried raw chick peas are placed in a steam chamber of the type commonly known as a steam gun. They are subjected in the gun to the action of superheated steam for about 45 seconds, preferably at a pressure of about 225 pounds per square inch, and a temperature of about 475° F. After the treatment interval, the pressure is suddenly released. This may be conveniently accomplished by releasing the closure at the end of the gun, whereupon the chick peas are violently discharged from the gun and projected through the atmosphere into a suitable receptacle or net. This operation loosens and removes the tough skins, which are largely dropped from the stream of projected peas at a point near the gun, due to their light weight. If the skins are not entirely separated in this way, the remaining skins can be easily separated by a subsequent operation of any desired character. Other mediums than steam may be used and the above mentioned figures for the time interval, pressure and temperature, may be departed from, but I have found that the figures named produce very satisfactory results, especially with a gun having a bore approximately 9½ inches long and 2¾ inches in diameter.

The apparatus employed in carrying out my process may take various forms. Suitable apparatus is disclosed, for example, in Patents 1,442,304 and 1,455,975, to Arthur R. Spencer and William J. Plews.

One of the outstanding features of my process is that the raw, hard, inedible chick peas may be converted into edible form in a fraction of a minute as distinguished from the known processes which require at least twenty-four hours. The shooting of the peas from the gun cooks them and gives them an attractive golden brown color. Analysis of them has shown that the starch cells are expanded to some extent, and that a large percentage (at least 10%) of dextrin and soluble starch exist in them. They are, therefore, non-fattening and easily digested. Actual tests have shown that my process does not destroy the vitamins, and that the fat content of the processed chick peas is slightly higher than that of chick peas prepared by the soaking and boiling method. This is apparently due to the fact that oxidation does not take place to a material extent.

Chick peas treated by my process may be marketed in the whole condition in which case they constitute a delicious substitute for nuts. They have a delicate, sweet and nutty flavor and their firmness or crispness is comparable with, or slightly in excess of, that of freshly roasted peanuts, as distinguished from that of chick peas baked in the sand which immediately reduce to a chalk-like powder in the mouth and have an insipid starchy flavor. If desired, they may be buttered and salted or coated with chocolate or the like. The processed peas when pulverized, absorb an appreciable amount of water and form a thick homogeneous paste. They are, therefore, well adapted to be sold in a pulverized condition, either with or without the addition of other ingredients, so that soups and the like can be quickly prepared. My process places the chick peas in such a condition that if it is desired to serve them as a vegetable, a very short cooking operation will suffice. They may be combined with other ingredients in the making of stews and the like without pre-cooking.

I claim:

1. An improved process of treating chick peas, which consists in placing them in a closed chamber, submitting them while in the chamber to the action of a steam at a pressure of approximately 225 pounds per square inch at a temperature of approximately 475° F. for a period of approximately 45 seconds, and then suddenly releasing the pressure.

2. An improved process of treating chick peas, which consists in placing the chick peas in a steam gun, admitting a heating fluid under pressure to the gun, and suddenly opening the gun to discharge the chick peas from the gun.

3. An improved process of treating chick peas which consists in loosening the skins and also cooking the chick peas by placing them in a closed chamber, submitting them while in the chamber to the action of super-heated steam and then suddenly releasing the pressure.

WILLIAM J. PLEWS.